(12) United States Patent
Engelmann et al.

(10) Patent No.: US 11,692,563 B2
(45) Date of Patent: Jul. 4, 2023

(54) MILLING MACHINE HAVING A VALVE CURRENT BASED HEIGHT MEASUREMENT SYSTEM

(71) Applicant: CATERPILLAR PAVING PRODUCTS INC., Brooklyn Park, MN (US)

(72) Inventors: Eric S. Engelmann, Delano, MN (US); Conwell K. Rife, Jr., Wayzata, MN (US); Mark Holub, Chillicothe, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 627 days.

(21) Appl. No.: 16/774,280

(22) Filed: Jan. 28, 2020

(65) Prior Publication Data

US 2021/0231138 A1  Jul. 29, 2021

(51) Int. Cl.
  *F15B 15/28* (2006.01)
  *E01C 23/088* (2006.01)

(52) U.S. Cl.
  CPC ........ *F15B 15/2838* (2013.01); *E01C 23/088* (2013.01); *F15B 2211/4053* (2013.01)

(58) Field of Classification Search
  CPC ................ E01C 23/088; F15B 15/2838; F15B 2211/4053; B60G 2500/30
  See application file for complete search history.

(56) References Cited

U.S. PATENT DOCUMENTS

| 3,802,525 A | 4/1974 | Snow, Jr. et al. |
| 4,139,318 A | 2/1979 | Jakob et al. |
| (Continued) | | |

FOREIGN PATENT DOCUMENTS

| EP | 1624278 A1 | 8/2006 |
| KR | 950001048 B1 | 2/1995 |
| (Continued) | | |

OTHER PUBLICATIONS

U.S. Patent Application of Eric S. Engelmann et al., entitled "Milling Machine Having a Fluid Flow Based Height Measurement System," filed Jan. 28, 2020.

(Continued)

*Primary Examiner* — Abiy Teka
(74) *Attorney, Agent, or Firm* — Finnegan, Henderson, Farabow, Garrett & Dunner, LLP.

(57) ABSTRACT

A milling machine may have a frame, a milling drum attached to the frame, and ground engaging tracks that support the frame and propel the milling machine in a forward or rearward direction. The milling machine may have height adjustable actuators connecting the frame to the tracks. Each actuator may have a cylinder attached to the frame, a piston slidably disposed within the cylinder, and a rod connected at a first end to the piston and connected to a track at a second end. The milling machine may have a tank storing hydraulic fluid and a fluid conduit connecting the tank to the cylinder. The milling machine may have a control valve selectively controlling a flow rate of the hydraulic fluid in the fluid conduit. The milling machine may also have a controller that determines a height of the frame relative to the ground surface based on the flow rate.

19 Claims, 8 Drawing Sheets

(56) References Cited

U.S. PATENT DOCUMENTS

| | | |
|---|---|---|
| 4,186,968 A | 2/1980 | Barton |
| 4,325,580 A | 4/1982 | Swisher, Jr. et al. |
| 4,456,863 A | 6/1984 | Matusek |
| 4,678,236 A | 7/1987 | Wirtgen |
| 4,943,119 A | 7/1990 | Zarniko et al. |
| 5,092,659 A | 3/1992 | Grathoff |
| 5,189,940 A | 3/1993 | Hosseini et al. |
| 5,308,219 A | 5/1994 | Lee |
| 5,309,407 A | 5/1994 | Sehr et al. |
| 5,318,378 A * | 6/1994 | Lent .................. E01C 23/088 404/90 |
| 5,378,081 A | 1/1995 | Swisher, Jr. |
| 5,467,541 A | 11/1995 | Greer et al. |
| 5,588,776 A | 12/1996 | Swisher, Jr. et al. |
| 5,607,205 A * | 3/1997 | Burdick ............. E01C 23/088 404/84.2 |
| 5,623,093 A | 4/1997 | Schenkel |
| 5,784,945 A | 7/1998 | Krone |
| 5,893,677 A | 4/1999 | Haehn et al. |
| 5,984,420 A | 11/1999 | Murray et al. |
| 6,152,648 A * | 11/2000 | Gfroerer ............. E01C 23/088 404/93 |
| 6,234,061 B1 | 5/2001 | Glasson |
| 6,282,891 B1 | 9/2001 | Rockwood |
| 6,450,048 B1 | 9/2002 | Samuelson et al. |
| 6,769,836 B2 | 8/2004 | Lloyd |
| 6,775,974 B2 | 8/2004 | Tabor |
| 6,923,508 B2 | 8/2005 | Holl et al. |
| 7,946,788 B2 | 5/2011 | Jurasz et al. |
| 7,997,117 B2 | 8/2011 | Zhang |
| 8,061,180 B2 | 11/2011 | Green |
| 8,113,592 B2 | 2/2012 | Busley et al. |
| 8,128,177 B2 | 3/2012 | Menzenbach et al. |
| 8,246,270 B2 | 8/2012 | Berning et al. |
| 8,308,395 B2 | 11/2012 | Jurasz et al. |
| 8,511,932 B2 | 8/2013 | Jurasz et al. |
| 8,690,474 B2 | 4/2014 | Jurasz et al. |
| 8,718,880 B2 | 5/2014 | Cadman |
| 8,807,867 B2 | 8/2014 | Berning et al. |
| 8,814,133 B2 | 8/2014 | Li |
| 9,010,871 B2 | 4/2015 | Busley et al. |
| 9,523,176 B2 | 12/2016 | Berning et al. |
| 9,656,530 B2 | 5/2017 | Busley et al. |
| 9,879,390 B2 | 1/2018 | Berning et al. |
| 9,879,391 B2 | 1/2018 | Berning et al. |
| 10,266,996 B2 | 4/2019 | Hogan |
| 10,358,799 B2 | 7/2019 | Fujii |
| 10,481,033 B2 | 11/2019 | Joshi |
| 2002/0100649 A1 | 8/2002 | Agrotis et al. |
| 2006/0024134 A1 | 2/2006 | Rio et al. |
| 2007/0098494 A1 * | 5/2007 | Mares ................ E01C 23/088 404/75 |
| 2008/0153402 A1 | 6/2008 | Arcona et al. |
| 2013/0166155 A1 | 6/2013 | Killion |
| 2014/0326908 A1 | 11/2014 | Schober |
| 2014/0379227 A1 * | 12/2014 | Reuter ................. B60G 17/04 299/1.5 |
| 2016/0076217 A1 | 3/2016 | Costello |
| 2016/0186391 A1 | 6/2016 | Wachsmann |
| 2016/0265174 A1 | 9/2016 | Engelmann |
| 2017/0100981 A1 | 4/2017 | Muir |
| 2017/0362784 A1 * | 12/2017 | Hoffmann ............ E01C 23/127 |
| 2018/0180068 A1 | 6/2018 | Fukuda et al. |
| 2022/0072922 A1 | 3/2022 | Ponstein |

FOREIGN PATENT DOCUMENTS

| | | |
|---|---|---|
| WO | WO 2002/057112 A1 | 7/2002 |
| WO | 2020135921 | 12/2018 |

OTHER PUBLICATIONS

U.S. Patent Application of Eric S. Engelmann et al., entitled "Milling Machine Having a Non-Contact Leg-Height Measurement System," filed Jan. 28, 2020.

* cited by examiner ation of the frame. Ultrasonic sensors, however, may
not provide a desired level of accuracy. Moreover, use of
such external sensors entails the additional and possibly
inconvenient steps of connecting those sensors to the milling
machine and its control systems. It may also be possible to
use proximity sensors located on the leg columns to position
the frame. However, proximity sensors may enable positioning of the frame only at discrete heights above the
ground surface based on where the proximity sensors are
mounted on the machine. It is, therefore, desirable to equip
a milling machine with height sensors that may help accurately position the frame at any desired height and/or orientation relative to a ground surface.

The milling machines and/or the height measurement system of the present disclosure solve one or more of the problems set forth above and/or other problems of the prior art.

MILLING MACHINE HAVING A VALVE CURRENT BASED HEIGHT MEASUREMENT SYSTEM

TECHNICAL FIELD

The present disclosure relates generally to a milling machine and, more particularly, to a milling machine having a valve current based height measurement system.

BACKGROUND

Road surfaces typically include an uppermost layer of asphalt or concrete on which vehicles travel. Over time, a road surface may wear out or may be damaged, for example, due to the formation of potholes or development of cracks and ruts. The damaged road surface may in turn cause damage to vehicles travelling on the road surface. The damaged road surface can be repaired locally by filling up the potholes, cracks, and/or ruts. However, it is often desirable to replace the worn or damaged road surface with an entirely new road surface. This is usually accomplished by removing a layer of the asphalt or concrete from the roadway and repaving the roadway by laying down a new layer of asphalt or concrete.

A milling machine is often used to remove the layer of asphalt or concrete on the roadway surface. A typical milling machine includes a frame supported on wheels or tracks by height adjustable leg columns and including a milling drum attached to the frame. As the milling machine is driven over the existing roadway surface, teeth or cutting tools on the rotating milling drum come into contact with the roadway surface and tear up a layer of the roadway. A milling drum chamber typically encloses the milling drum to contain the milled material. The milled material is typically transported using a conveyor system to an adjacent vehicle, which removes the material from the worksite. Following the milling process, a new layer of asphalt or concrete may be applied on the milled road surface to create a new roadway surface.

In another application, it is sometimes desirable to stabilize or reconstitute the upper layer of a roadway or a worksite. This is usually accomplished by removing the upper layer, mixing it with stabilizing components such as cement, ash, lime, etc., and depositing the mixture back on top of the roadway or worksite. A milling machine, such as a stabilizer or reclaimer is often used for this purpose. Such milling machines may also include a frame supported on tracks or wheels by height adjustable leg columns and including a milling drum attached to the frame. The milling drum is enclosed in a drum chamber. The cutting tools or teeth on the milling drum tear up the ground and push the removed material toward a rear of the drum chamber. Stabilizing ingredients and/or water are mixed with the milled material, which is then deposited back on to the ground towards the rear of the drum chamber.

In both types of milling machines discussed above, it is often necessary to position the frame at a desired height and/or orientation relative to the ground surface. For example, it may be necessary to orient the frame at a predetermined inclination relative to the ground surface to achieve a corresponding inclination of the milled surface. It may also be necessary to raise the frame to a desired height to perform maintenance operations. It is therefore desirable to accurately determine a height and/or an inclination of the frame relative to the ground surface.

Externally attached sensors, for example, ultrasonic grade sensors may be used to determine and adjust the height and orientation of the frame. Ultrasonic sensors, however, may

SUMMARY

In one aspect, the present disclosure is directed to a milling machine. The milling machine may include a frame and a milling drum attached to the frame. The milling machine may also include a plurality of ground engaging tracks configured to support the frame and to propel the milling machine in a forward or rearward direction. The milling machine may include a plurality of actuators connecting the frame to the tracks. The actuators may be configured to adjust a height of the frame relative to a ground surface. Each actuator may include a cylinder attached to the frame and containing a hydraulic fluid. Each actuator may also include a piston slidably disposed within the cylinder. In addition, each actuator may include a rod having a first end connected to the piston and extending to a second end connected to a track from among the plurality of tracks. The milling machine may include a tank configured to store the hydraulic fluid and a fluid conduit connecting the tank to the cylinder. Further, the milling machine may include a control valve configured to selectively control a flow rate of the hydraulic fluid in the fluid conduit. The milling machine may also include a controller configured to determine a height of the frame relative to the ground surface based on the flow rate.

In another aspect, the present disclosure is directed to a method of determining a height of a frame of a milling machine relative to a ground surface. The milling machine may have a frame supported by a plurality of tracks connected to the frame by a plurality of actuators. The milling machine may have a tank configured to store hydraulic fluid. Each actuator may be connected to the tank via a fluid conduit. The milling machine may also have a control valve disposed in the fluid conduit, and a controller. The method may include operating the milling machine by raising or lowering the frame relative to at least one track from among the plurality of tracks. The method may also include determining an amount of current flowing through the control valve associated with at least one actuator from among the plurality of actuators. The method may include determining, using the controller, a flow rate of the hydraulic fluid through the control valve. In addition, the method may include determining, using the controller, a height of the frame relative to the tracks based on the flow rate.

In yet another aspect, the present disclosure is directed to a milling machine. The milling machine may include a frame. The milling machine may also include a left front track disposed adjacent a front end of the frame, a right front track disposed adjacent the front end and spaced apart from the left front track, and at least one rear track disposed adjacent a rear end of the frame. Further, the milling machine may include a milling drum connected to the frame and disposed between the front end and the rear end. The milling machine may also include an engine configured to rotate the milling drum and propel the left front track, the right front track, and the at least one rear track in a forward or rearward direction. The milling machine may include height adjustable leg columns connecting the frame to the left front track, the right front track, and the at least one rear track. Each leg column may include an upper section connected to the frame, and a lower section slidably movable relative to the upper section and connected to one track of the left front track, the right front track, and the at least one rear track. Each leg column may also include a height adjustable hydraulic actuator connected at one end to the frame and at an opposite end to the one track. The milling machine may include a tank configured to store hydraulic fluid and a fluid conduit connecting the tank to the hydraulic actuator. The milling machine may also include a control valve configured to selectively control a flow rate of the hydraulic fluid in the fluid conduit between the tank and the actuator. Further, the milling machine may include a controller configured to determine an amount of current flowing through the control valve. The controller may also be configured to determine the flow rate of the hydraulic fluid in the fluid conduit based on the amount of current. Further, the controller may be configured to determine a height of the frame relative to a ground surface based on the determined flow rate.

DETAILED DESCRIPTION

Figure 1:
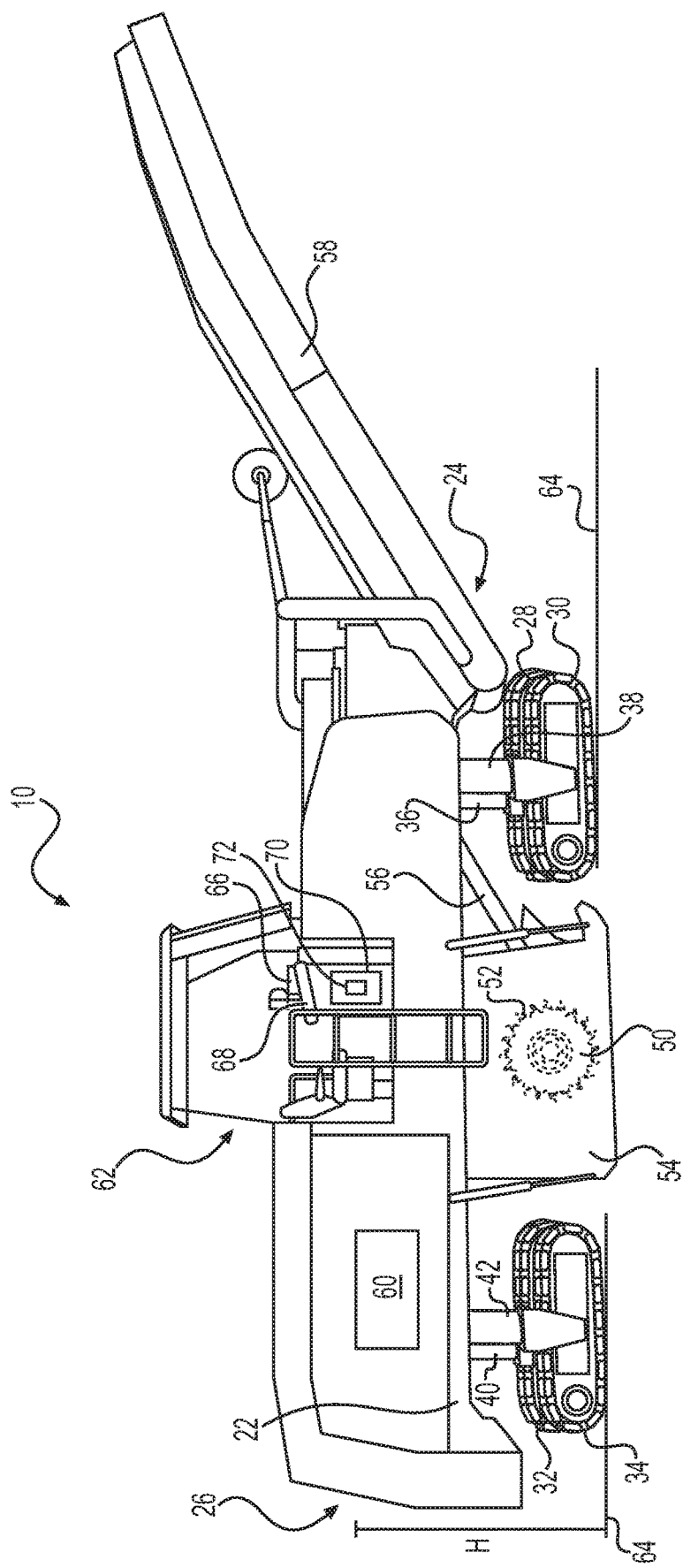
FIG. 1 is an illustration of an exemplary milling machine.
Figure 2:
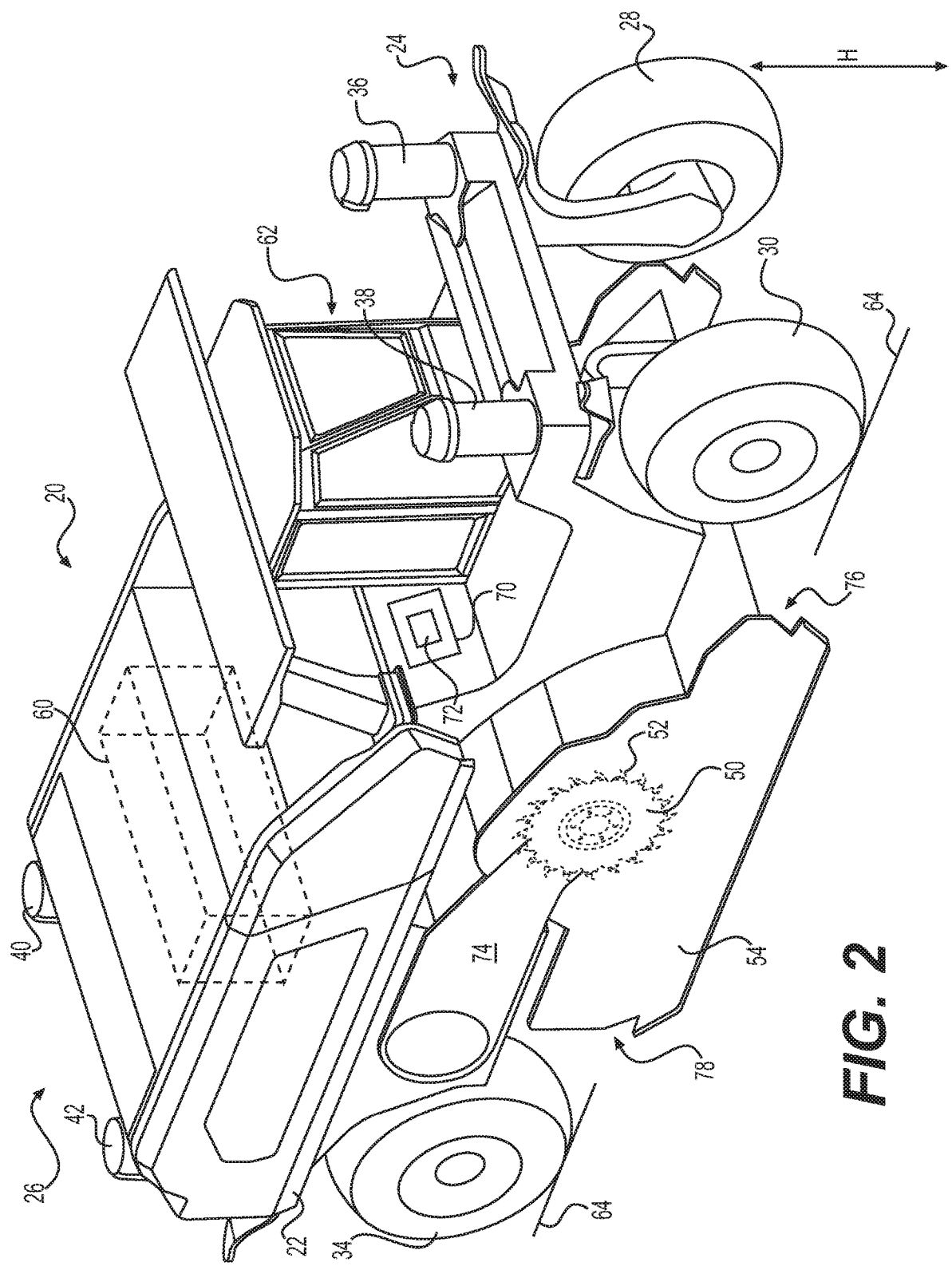
FIG. 2 is an illustration of another exemplary milling machine.

FIGS. 1 and 2 illustrate exemplary milling machines 10 and 20, respectively. In one exemplary embodiment as illustrated in FIG. 1, milling machine 10 may be a cold planer, which may also be referred to as a cold milling machine, a scarifier, a profiler, etc. Milling machine 10 may include frame 22, which may extend from first end 24 to second end 26 disposed opposite first end 24. In some exemplary embodiments, first end 24 may be a front end and second end 26 may be a rear end of frame 22. Frame 22 may have any shape (e.g. rectangular, triangular, square, etc.)

Frame 22 may be supported on one or more propulsion devices. For example, as illustrated in FIG. 1, frame 22 may be supported on propulsion devices 28, 30, 32, 34. Propulsion devices 28, 30, 32, 34 may be equipped with electric or hydraulic motors which may impart motion to propulsion devices 28, 30, 32, 34 to help propel machine 10 in a forward or rearward direction. In one exemplary embodiment as illustrated in FIG. 1, propulsion devices 28, 30, 32, 34 may take the form of tracks, which may include, for example, sprocket wheels, idler wheels, and/or one or more rollers that may support a continuous track. However, it is contemplated that propulsion devices 28, 30, 32, 34 of milling machine 10 may take the form of wheels (see FIG. 2.) In the present disclosure, the terms track and wheel will be used interchangeably and will include the other of the two terms.

Tracks 28, 30 may be located adjacent first end 24 of frame 22 and tracks 32, 34 may be located adjacent second end 26 of frame 22. Track 28 may be spaced apart from track 30 along a width direction of frame 22. Likewise, track 32 may be spaced apart from track 34 along a width direction of frame 22. In one exemplary embodiment as illustrated in FIG. 1, track 28 may be a left front track, track 30 may be a right front track, track 32 may be a left rear track, and track 34 may be a right rear track. Some or all of propulsion devices 28, 30, 32, 34 may also be steerable, allowing machine 10 to be turned towards the right or left during a forward or rearward motion on ground surface 64. Although milling machine 10 in FIG. 1 has been illustrated as including four tracks 28, 30, 32, 34, it is contemplated that in some exemplary embodiments, milling machine 10 may have only one rear track 32 or 34, which may be located generally centered along a width of frame 22.

Frame 22 may be connected to tracks 28, 30, 32, 34 by one or more leg columns 36, 38, 40, 42. For example, as illustrated in FIG. 1, frame 22 may be connected to left front track 28 via leg column 36 and to right front track 30 via leg column 38. Likewise, frame 22 may be connected to left rear track 32 via leg column 40 and to right rear track 34 via leg column 42. One or more of leg columns 36, 38, 40, 42 may be height adjustable such that a height of frame 22 relative to one or more of tracks 28, 30, 32, 34 may be increased or decreased by adjusting a length of one or more of leg columns 36, 38, 40, 42, respectively. It will be understood that adjusting a height of frame 22 relative to one or more of tracks 28, 30, 32, 34 would also adjust a height of frame 22 relative to ground surface 64 on which tracks 28, 30, 32, 34 may be supported.

Machine 10 may include milling drum 50, which may be attached to frame 22 between front end 24 and rear end 26. Milling drum 50 may include cutting tools 52 (or teeth 52) that may be configured to cut into and tear up a predetermined thickness of a roadway or the ground. A height of milling drum 50 relative to the ground surface 64 may be adjusted by adjusting a height of one or more leg columns 36, 38, 40, 42. As milling drum 50 rotates, teeth 52 of milling drum 50 may come into contact with the ground or roadway surface, thereby tearing up or cutting the ground or roadway surface. Milling drum 50 may be enclosed within drum chamber 54 which may help contain the material removed by teeth 52 from the ground or roadway surface. Machine 10 may include one or more conveyors 56, 58, which may help transport the material removed by milling drum 50 to an adjacent vehicle such as a dump truck.

Milling machine 10 may include engine 60, which may be attached to frame 22. Engine 60 may be any suitable type of internal combustion engine, such as a gasoline, diesel, natural gas, or hybrid-powers engine. It is contemplated, however, that in some exemplary embodiments, engine 60 may be driven by electrical power. Engine 60 may be configured to deliver rotational power output to one or more hydraulic motors associated with propulsion devices 28, 30, 32, 34, to milling drum 50, and to the one or more conveyors 56, 58. Engine 60 may also be configured to deliver power to operate one or more other components or accessory devices (e.g. pumps, fans, motors, generators, belt drives, transmission devices, etc.) associated with milling machine 10.

Milling machine 10 may include operator platform 62, which may be attached to frame 22. In some exemplary embodiments, operator platform 62 may be in the form of an open-air platform that may or may not include a canopy. In other exemplary embodiments, operator platform 62 may be in the form of a partially or fully enclosed cabin. As illustrated in FIG. 1, operator platform 62 may be located at a height "H" above ground surface 64. In some exemplary embodiments, height H may range between about 2 ft to 10 ft above ground surface 64. Operator platform 62 may include one or more controls 66, which may be used by an operator to operate and/or control milling machine 10. Control 66 may include one or more input devices 66, which may take the form of buttons, switches, sliders, levers, wheels, touch screens, or other input/output or interface devices. Milling machine 10 may include display 68 located in operator platform 62. Display 68 may be configured to display information, data, and/or measurements obtained from one or more sensors of milling machine 10. Display 68 may also be configured to display diagnostic results, errors, and/or alerts. Display 68 may be a cathode ray tube (CRT) monitor, a liquid crystal display (LCD), a light emitting diode (LED) display, a touchscreen display, or any other kind of display.

Milling machine 10 may also include controller 70, which may be configured to receive inputs, data, and/or signals from the one or more input devices 66, and or other sensors associated with milling machine 10 and to control the operation of one or more components (e.g. engine 60, milling drum 50, propulsion devices 28, 30, 32, 34, conveyors 56, 58, etc.) Controller 70 may include or be associated with one or more processors, memory devices 72, and/or communication devices. Controller 70 may embody a single microprocessor or multiple microprocessors, digital signal processors (DSPs), application-specific integrated circuit devices (ASICs), etc. Numerous commercially available microprocessors may be configured to perform the functions of controller 70. Various other known circuits may be associated with controller 70, including power supply circuits, signal-conditioning circuits, and communication circuits, etc. Controller 70 may also include one or more internal timers configured to monitor a time at which controller 70 may receive signals from one or more sensors or a time at which controller 70 may issue command signals to one or more components of milling machine 10.

The one or more memory devices 72 associated with controller 70 may store, for example, data and/or one or more control routines or instructions. The one or more memory devices 72 may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Controller 70 may receive one or more input signals from the one or more input devices 66, and may execute the routines or instructions stored in the one or more memory devices 72 to generate and deliver one or more command signals to one or more of propulsion devices 28, 30, 32, 34, engine 60, milling drum 50, conveyors 56, 58, or other components of milling machine 10.

FIG. 2 illustrates another exemplary embodiment of a milling machine. In one exemplary embodiment as illustrated in FIG. 2, milling machine 20 may be a reclaimer, which may also be called soil stabilizer, reclaiming machine, road reclaimer, etc. Like milling machine 10, milling machine 20 may include frame 22, propulsion devices in the form of wheels 28, 30, 32 (not visible in FIG. 2), 34, and leg columns 36, 38, 40, 42. In some exemplary embodiments, one or more leg columns 36, 38, 40, 42 may be height adjustable such that a height of frame 22 relative to one or more of wheels 28, 30, 32, 34 may be increased or decreased by adjusting a length of one or more leg columns 36, 38, 40, 42, respectively. As illustrated in FIG. 2, leg column 36 may connect frame 22 to the left front wheel 28, leg column 38 may connect frame 22 to a right front wheel 30, leg column 40 may connect frame 22 to left rear wheel 32 (not visible in FIG. 2), and leg column 42 may connect frame 22 to right rear wheel 34. Although, milling machine 20 has been illustrated in FIG. 2 as including wheels 28, 30, 32, 34, it is contemplated that milling machine 20 may instead include tracks 28, 30, 32, 34. One or more of wheels 28, 30, 32, 34 may be steerable, allowing milling machine 20 to be turned towards the right or left during a forward or rearward motion on ground surface 64.

Milling drum 50 of milling machine 20 may be located between first end 24 and second end 26. In one exemplary embodiment as illustrated in FIG. 2, milling drum 50 of milling machine 20 may not be directly attached to frame 22. Instead, as illustrated in FIG. 2 milling drum 50 of milling machine 20 may be attached to frame 22 via arms 74. Arms 74 may include a pair of arms (only one of which is visible in FIG. 2) disposed on either side of milling machine 20. Arms 74 may be pivotably attached to frame 22 and may be configured to be rotatable relative to frame 22. One or more actuators may be connected between frame 22 and arms 74 and may be configured to move arms 74 relative to frame 22. Thus, unlike milling machine 10, milling drum 50 of milling machine 20 may be movable relative to frame 22. It is contemplated, however, that in other exemplary embodiments, milling drum 50 may be directly attached to frame 22 of machine 20 in a manner similar to that described above for machine 10.

Milling drum 50 of milling machine 20 may include cutting tools 52 (or teeth 52). A height of milling drum 50 above the ground surface may be adjusted by rotating arms 74 relative to frame 22 and/or by adjusting one or more of leg columns 36, 38, 40, 42. As milling drum 50 rotates, teeth 52 may come into contact with and tear or cut the ground or roadway surface. Milling drum 50 may be enclosed within drum chamber 54 which may help contain the material removed by teeth 52 from the ground or roadway surface. Rotation of milling drum 50 may cause the removed material to be transferred from adjacent front end 76 of drum chamber 54 towards rear end 78 of drum chamber 54. Stabilizing components such as ash, lime, cement, water, etc. may be mixed with the removed material and the reconstituted mixture of the milled material and the stabilizing components may be deposited on ground surface 64 adjacent rear end 78 of drum chamber 54.

Like milling machine 10, milling machine 20 may also include engine 60, operator platform 62, one or more control or input devices 66, display 68, and controller 70, all of which may have structural and functional characteristics similar to those discussed above with respect to milling machine 10. Additionally, it will be understood that as used in this disclosure the terms front and rear are relative terms, which may be determined based on a direction of travel of milling machine 10 or 20. Likewise, it will be understood that as used in this disclosure, the terms left and right are relative terms, which may be determined based on facing the direction of travel of milling machine 10 or 20.

Figure 3A:
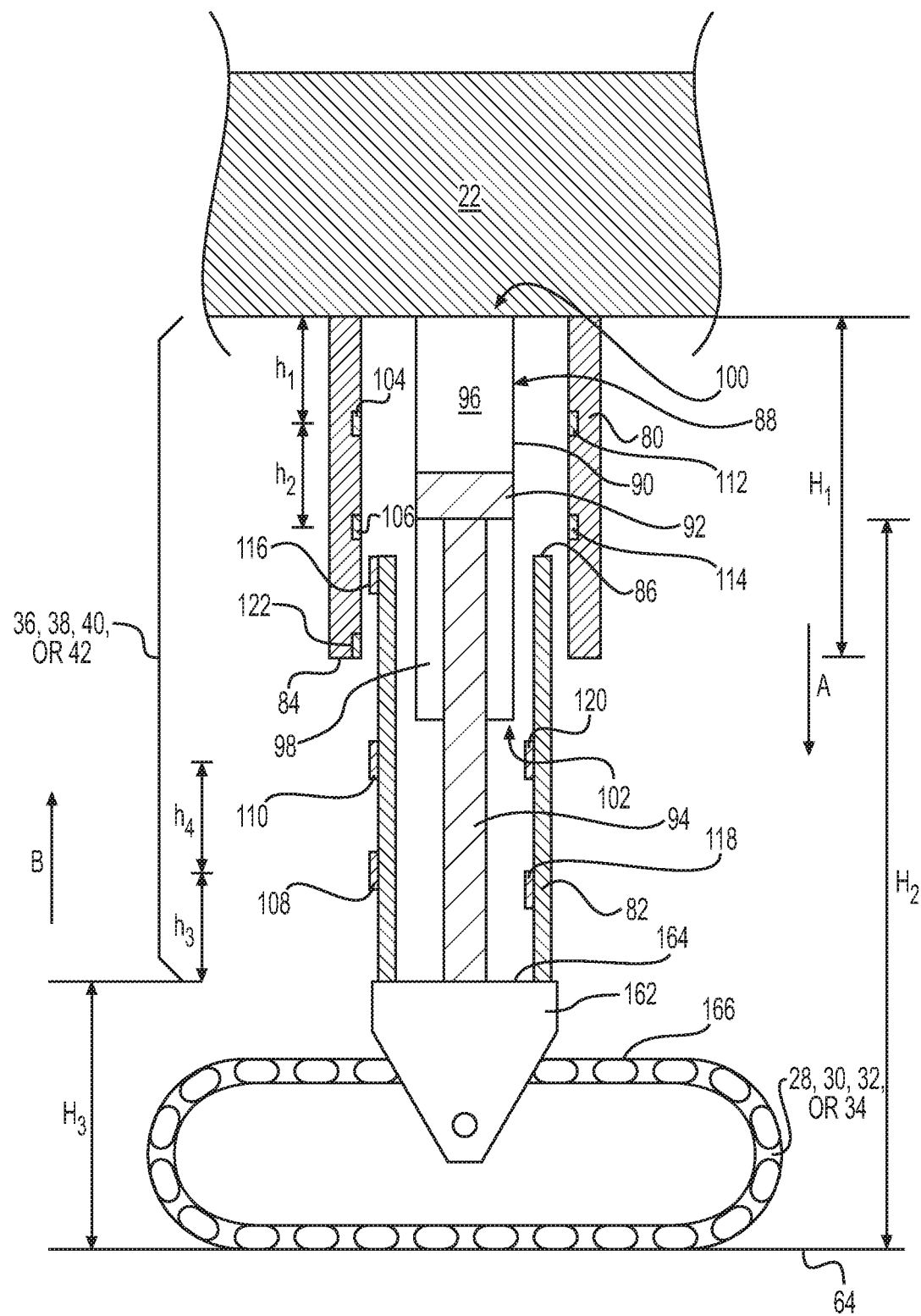
FIG. 3A is a partial cross-section view illustration of an exemplary leg column for the milling machines of FIGS. 1 and 2.

FIG. 3A is a partial cross-sectional view illustration of an exemplary leg column 36, 38, 40, 42 for milling machine 10 or 20. Leg column 36 may include first (or upper) section 80 and second (or lower) section 82. Actuator 88 may be disposed within or outside leg column 36. First section 80 may be attached to frame 22. In one exemplary embodiment, first section 80 may be rigidly attached to frame 22. First section 80 may extend from frame 22 towards track 28. In some exemplary embodiments, first section 80 may also extend into frame 22 in a direction away from track 28. As illustrated in FIG. 3A, edge 84 of first section 80 may have a height "$H_1$" relative to frame 22. Second section 82 may be attached to track 28 and may extend from track 28 toward frame 22. As illustrated in FIG. 3A, edge 86 of second section 82 may have a height "$H_2$" relative to ground surface 64. Heights $H_1$ and $H_2$ may be fixed and may be determined based on the geometrical dimensions of machine 10 or 20.

In one exemplary embodiment as illustrated in FIG. 3A, first and second sections 80, 82 may be hollow cylindrical tubes. It is contemplated, however, that first and second sections 80, 82 may have other non-cylindrical shapes. First and second sections 80, 82 may be configured to slidably move relative to each other. As illustrated in the exemplary embodiment of FIG. 3A, second section 82 may have a smaller cross-section relative to first section 80 and may be received within first section 80. It is contemplated, however, that in other exemplary embodiments, first section 80 may have a smaller cross-section relative to second section 82 and may be received within second section 82. First and second sections 80, 82 may form a variable height enclosure within which actuator 88 may be located. It is also contemplated, however, that actuator 88 may be located outside the enclosure formed by first and second sections 80, 82.

Actuator 88 may connect frame 22 with track 28. Actuator 88 may include cylinder 90, piston 92, and rod 94. Cylinder 90 may extend from frame end 100 connected to frame 22 to track end 102 which may be disposed between frame 22 and track 28. Piston 92 may be slidably disposed within cylinder 90 and may divide cylinder 90 into head-end chamber 96 and rod-end chamber 98. That is, piston 92 may be configured to slide within cylinder 90 from adjacent frame end 100 to adjacent track end 102. Head-end chamber 96 may be disposed nearer frame end 100 of cylinder 90 and rod-end chamber 98 may be disposed nearer track end 102 of cylinder 90. Rod 94 may be connected at one end to piston 92. Rod 94 may extend from piston 92, through track end 102 of cylinder 90, and may be directly or indirectly connected at an opposite end of rod 94 to track 28. In one exemplary embodiment as illustrated in FIG. 3A, rod 94 may be connected to yoke 162, which in turn may be connected to track 28. In some exemplary embodiments, yoke 162 may be fixedly attached to second section 82 of leg column 36. In other exemplary embodiments, yoke 162 may be a part of track 28 and may be movably attached to second section 82. It is also contemplated that in some embodiments, yoke 162 may not be attached to second section 82.

Actuator 88 may be a single-acting or double-acting hydraulic actuator. For example, one or both of head-end chamber 96 and rod-end chamber 98 of actuator 88 may be configured to receive and hold hydraulic fluid. One or both of head-end chamber 96 and rod-end chamber 98 may be connected to tank 170 (see FIGS. 4A, 4B) configured to store hydraulic fluid. Filling head-end chamber 96 with hydraulic fluid and/or emptying hydraulic fluid from rod-end chamber 98 may cause piston 92 to slidably move within cylinder 90 in a direction shown by arrow "A" from frame end 100 toward track end 102. Piston movement in direction A may result in an increase in a length of actuator 88, causing first and second sections 80 and 82 to slidably move relative to each other thereby increasing a height of leg column 36, and thereby also increasing a height of frame 22 relative to track 28 or a height of frame 22 relative to ground surface 64. Similarly, emptying hydraulic fluid from head-end chamber 96 and/or filling rod-end chamber 98 with hydraulic fluid may cause piston 92 to slidably move within cylinder 90 in a direction shown by arrow "B" from track end 102 towards frame end 100. Piston movement in direction B may decrease the length of actuator 88 thereby decreasing the height of leg column 36, which in turn may decrease the height of frame 22 relative to ground surface 64.

Leg column 36 may include one or more proximity sensors (or switching devices) 104, 106, 108, 110. As illustrated in FIG. 3A, proximity sensors 104 and 106 may be attached to first section 80 of leg column 36. For example, as illustrated in FIG. 3A, proximity sensor 104 may be attached to first section 80 at distance "$h_1$" relative to frame 22, and proximity sensor 106 may be attached to first section 80 at distance "$h_2$" relative to proximity sensor 104. In one exemplary embodiment, proximity sensors 104, 106 may be break beam sensors that may include receivers 112, 114 that may be attached to first section 80. As illustrated in the exemplary embodiment of FIG. 3A, receiver 112 may be attached to first section 80 at distance $h_1$ relative to frame 22, and receiver 114 may be attached to first section 80 at distance $h_2$ relative to receiver 112. Receivers 112, 114 may be circumferentially positioned on first section 80 so that they may receive a generally collimated or focused beam of light (e.g. infrared, laser, or any other wavelength) or other electromagnetic radiation from proximity sensors 104, 106.

As discussed above, second section 82 may be configured to slidably move relative to first section 80. When edge 86 of second section 82 is positioned adjacent proximity sensors 104, 106, second section 82 may block the beam transmitted from proximity sensors 104, 106 preventing the beam from being received by receivers 112, 114, respectively. Proximity sensors 104, 106 may be triggered and may generate a signal in two scenarios. In the first scenario, the beam transmitted by proximity sensors 104, 106 may be received by receivers 112, 114, respectively. As second section 82 moves relative to first section 80, edge 86 of second section 82 may block reception of the beam by receivers 112, 114. Proximity sensors 104 and 106 may generate a signal when the beam previously being received by receivers 112, 114, respectively, is blocked. That is proximity sensors 104 and 106 may generate a signal when there is a transition from an unblocked beam to a blocked beam. Conversely, in the second scenario, second section 82 may be positioned such that the beams emanating from proximity sensors 104, 106 may be blocked by second section 82. As second section 82 moves relative to first section 80, the hitherto blocked beam may be unblocked so that receivers 112, 114 may begin receiving the beams emanating from proximity sensors 104, 106, respectively. Thus, proximity sensors 104, 106 may generate a signal when there is a transition from a blocked beam to an unblocked beam. In both scenarios, proximity sensors 104 and 106 may generate signals when they detect the presence of edge 86 adjacent a respective proximity sensor 104, 106.

Although proximity sensors 104, 106 have been described above as break beam sensors, it is contemplated that proximity sensors 104, 106 may include resistive, inductive, capacitive, optical, or any other type of proximity sensors. For example, as illustrated in FIG. 3A, in some embodiments, proximity sensors 104, 106 may be configured to detect either edge 86 or target 116 positioned on second section 82 adjacent edge 86. Target 116 may extend around a portion of or all of a perimeter of second section 82. In some exemplary embodiments, proximity sensors 104, 106 may be configured to detect edge 86 or target 116 based on changes in inductance, capacitance, or in any other electrical property caused by positioning edge 86 or target 116 adjacent proximity sensors 104 or 106. In other exemplary embodiments, proximity sensors 104, 106 may include imaging devices that may be configured to detect edge 86 or target 116 as being disposed adjacent proximity sensors 104, 106, using image processing techniques.

In some exemplary embodiments, leg column 36 may additionally or alternatively include proximity sensors 108, 110, which may be attached to second section 82. For example, as illustrated in FIG. 3A, proximity sensor 108 may be attached to second section 82 at distance "$h_3$" relative to track 28, and proximity sensor 110 may be attached to second section 82 at distance "$h_4$" relative to proximity sensor 108. Height $H_3$ of track 28 relative to ground surface 64 may be known based on geometrical dimensions of machine 10 or 20. In some exemplary embodiments, proximity sensors 108, 110 may be break beam sensors and may include receivers 118, 120 respectively. When proximity sensors 108, 110 are break beam sensors, proximity sensors 108, 110 may be attached to an inner surface of second section 82. As illustrated in FIG. 3A, receiver 118 may be attached to second section 82 at distance "$h_3$" relative to track 28, and receiver 120 may be attached to second section 82 at distance "$h_4$" relative to proximity sensor 108. Proximity sensors 108, 110, and receivers 118, 120 may have structural and functional characteristics similar to those discussed above with respect to proximity sensors 104, 106 and receivers 112, 114, respectively. The light or electromagnetic beam between proximity sensors 104, 106 and receivers 112, 114, respectively may be blocked or unblocked by track end 102 of cylinder 90 as actuator 88 is extended or retracted. In some exemplary embodiments where second section 82 has a size larger than first section 80, the light or electromagnetic beam between proximity sensors 104, 106 and receivers 112, 114, respectively may be blocked or unblocked by edge 84 of upper section 80. Thus, controller 70 may be configured to detect that track end 102 or edge 84 of first section 80 is positioned adjacent proximity sensors 108 or 110 based on whether the beams transmitted by proximity sensors 108 or 110 are blocked or unblocked. In some exemplary embodiments, target 122 may be attached to first section 80 adjacent edge 84. Target 122 may extend around a portion of or all of a perimeter of first section 80. Controller 70 may be configured to detect whether target 122 is positioned adjacent proximity sensors 108 or 110.

Although proximity sensors 108, 110 have been described above as break beam sensors, proximity sensors 108, 110 may include resistive, inductive, capacitive, optical, or any other type of proximity sensors. For example, proximity sensors 108, 110 may be configured to detect track end 102, edge 84, or target 122 based on changes in resistance, inductance, capacitance, optical images, or in any other electrical property caused by positioning track end 102, edge 84, or target 122 adjacent proximity sensors 108, 110.

Controller 70 may determine a height of frame 22 relative to ground surface 64 based on the known distances $h_1$, $h_2$, $h_3$, $h_4$, $H_1$, $H_2$, and/or $H_3$. For example, controller 70 may determine a height of leg column 36 based on the signals received from proximity sensors 104, 106. Controller 70 may receive a signal from proximity sensor 104, indicating that edge 86 of second section 82 is positioned adjacent proximity sensor 104. Controller 70 may determine that edge 86 of second section 82 is positioned at a distance $h_1$ from frame 22 based on the position of proximity sensor 104 relative to frame 22. Because edge 86 has a known height $H_2$ relative to ground surface 64, controller 70 may determine a height of frame 22 relative to ground surface 64 to be about $h_1+H_2$. Controller 70 may determine the height of frame 22 above ground surface 64 based on signals received from proximity sensor 106 in a similar manner.

By way of another example, controller 70 may receive a signal from proximity sensor 108 indicating that edge 84 of first section 80 is positioned adjacent proximity sensor 108. Controller 70 may determine that edge 84 of first section 80 is positioned at a height $h_3+H_3$ relative to ground surface 64 based on the position of proximity sensor 108 relative to ground surface 64. Further, because the height $H_1$ of edge 84 relative to frame 22 is known based on the geometry of machine 10 or 20, controller 70 may determine a height of frame 22 above ground surface 64 to be about $H_1+h_3+H_3$. Controller 70 may determine the height of frame 22 above ground surface 64 based on signals received from proximity sensor 110 in a similar manner. Thus, when controller 70 detects that edge 86 of second section 82 or target 116 is positioned adjacent proximity sensors 104, 106, controller 70 may be able to precisely determine a height of frame 22 relative to ground surface 64. Likewise, when controller 70 detects that edge 84 of first section 80, target 122, or track end 102 is positioned adjacent proximity sensors 108, 110, controller 70 may be able to precisely determine a height of frame 22 relative to ground surface 64. In some exemplary embodiments, controller 70 may also be configured to cause display 68 to display the determined height of frame 22. Although heights $h_3$ and $H_3$ have been illustrated relative to an upper surface 164 of yoke 162 in FIG. 3A, it is contemplated that in some exemplary embodiments, heights $h_3$ and $H_3$ may instead be measured relative to an upper surface 166 of track 28.

Figure 3B:
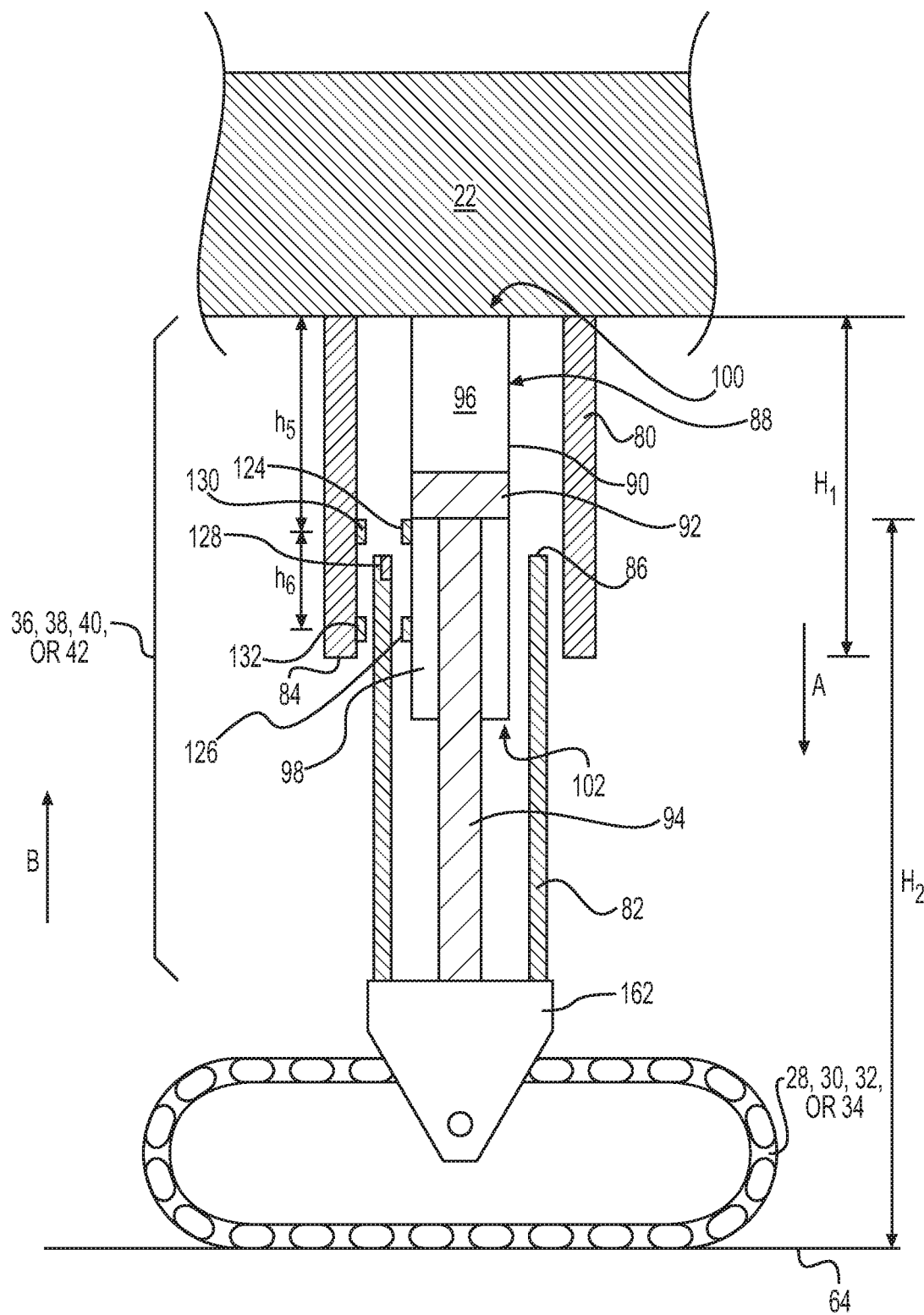
FIG. 3B is a partial cross-section view illustration of another exemplary leg column for the milling machines of FIGS. 1 and 2.

FIG. 3B is a partial cross-sectional view illustration of another exemplary leg column 36, 38, 40, 42 for milling machine 10 or 20. Many of the features of leg column 36, 38, 40, 42 illustrated in FIG. 3B are similar to those of leg column 36, 38, 40, 42 of FIG. 3A. In the following disclosure, only features of leg columns 36, 38, 40, 42 that are different in the embodiment of FIG. 3B will be discussed in detail. As illustrated in FIG. 3B, leg column 36 may include proximity sensors 124, 126, and target 128. Proximity sensor 124 may be positioned on cylinder 90 at distance "$h_5$" relative to frame 22. Proximity sensor 126 may be positioned on cylinder 90 at distance "$h_6$" relative to proximity sensor 126. Proximity sensors 124, 126 may have structural and functional characteristics similar to those of one or more of proximity sensors 104, 106, 108, 110 discussed above and may be configured to detect the presence of one or more receivers 130, 132 positioned, for example, on first section 80 at distances $h_5$ and $h_6$, respectively. In some exemplary embodiments, proximity sensors 124, 126 may detect the position of receivers 130, 132 positioned, for example, on first section 80 based on changes in resistance, inductance, capacitance, or in optical images, etc. In other exemplary embodiments, proximity sensors 124, 126 may detect the presence of edge 86 of second section 82, or of target 128 attached to second section 82 adjacent edge 86 based on changes in resistance, inductance, capacitance, optical images, etc. as discussed above with respect to proximity sensors 104, 106, 108, 110. Target 128 may extend around a portion of or all of a perimeter of second section 82. Proximity sensors 124, 126 may send signals to controller 70 which may enable controller 70 to determine that edge 86 and/or target 128 may be positioned adjacent one of proximity sensors 124, 126. Based on the known distances $h_5$, $h_6$, and based on the geometrical dimensions of machine 10 or 20, controller 70 may precisely determine a height of frame 22 relative to ground surface 64 when edge 86 and/or target 128 are positioned adjacent proximity sensors 124, 126. Although proximity sensors 124, 126 have been illustrated as being attached to cylinder 90 in FIG. 3B, it is contemplated that proximity sensors 124, 126 may additionally or alternatively be attached to rod 94.

Although targets 116, 122 (FIG. 3A) and target 128 (FIG. 3B) have been illustrated and described above as being positioned adjacent edges 84 or 86, it is contemplated that targets 116, 122, 128 may be positioned at any known distance from edges 84 or 86. Further, although only proximity sensors 104, 106, 108, 110, 124, 126, receivers 112, 114, 118, 120, 130, 132, and targets 116, 122, 128 are illustrated in FIGS. 3A and 3B and described above, it is contemplated that one or more leg columns 36, 38, 40, 42 may include any number of proximity sensors, receivers, and/or targets. It is also contemplated that one or more of leg columns 36, 38, 40, 42 may include some but not all of proximity sensors 104, 106, 108, 110, 124, 126, receivers 112, 114, 118, 120, 130, 132, and/or targets 116, 122, 128 and associated heights relative to frame 22, upper edge 164 of yoke 162, and/or upper surface 166 of track 28. It is also contemplated that in some exemplary embodiments, instead of being attached to leg column 36 or actuator 88, one or more of proximity sensors 104, 106, 108, 110, 124, 126, receivers 112, 114, 118, 120, 130, 132, and/or targets 116, 122, 128 may be attached to other structural members (e.g. slidable rods, tubes, etc.) disposed within the enclosure formed by first and second sections 80, 82. It is also contemplated that these slidable structural members may be attached to frame 22 and/or to track 28.

It is further contemplated that in some exemplary embodiments, controller 70 may be configured to stop movement (e.g. extraction or retraction) of actuator 88 based on inputs received from the one or more input devices 66. Controller 70 may be configured to stop movement of actuator 88 by stopping a flow of hydraulic fluid into or out of head-end chamber 96 or rod-end chamber 98. By way of example, input device 66 may be configured to specify a desired height of frame 22 relative to ground surface 64 with reference to known positions of the one or more proximity sensors 104, 106, 108, 110, 124, and/or 126. Controller 70 may be configured to stop a movement of actuator 88 upon receiving a signal indicating that edge 84, edge 86, or track end 102 are positioned adjacent proximity sensors 104, 106, 108, 110, 124, or 126. For example, proximity sensor 106 may correspond to a service height (e.g. height of frame 22 suitable for performing maintenance operations). When an operator uses input device 66 to specify that frame 22 should be raised to the service height, controller 70 may be configured to stop movement of actuator 88 when it receives a signal from proximity sensor 106 that edge 86 of second section 82 is positioned adjacent proximity sensor 106.

In some exemplary embodiments, the positions of one or more of proximity sensors 104, 106, 108, 110, 124, 126, receivers 112, 114, 118, 120, 130, 132, and/or targets 116, 122, 128 may not be fixed. Instead, one or more of proximity sensors 104, 106, 108, 110, 124, 126, receivers 112, 114, 118, 120, 130, 132, and/or targets 116, 122, 128 may be movable and may be configured to be positioned at any desired distance relative to frame 22 or track 28. For example, in some embodiments, one or more of proximity sensors 104, 106, 108, 110, 124, 126, receivers 112, 114, 118, 120, 130, 132, and/or targets 116, 122, 128 may be associated with servo motors, rack and pinion arrangements, string and pulley arrangements, or other mechanical devices configured to allow proximity sensors 104, 106, 108, 110, 124, 126, receivers 112, 114, 118, 120, 130, 132, and/or targets 116, 122, 128 to be positioned at any desired distance relative to frame 22 or track 28. By way of example, an operator may specify the desired distances for one or more proximity sensors, receivers, or targets using one or more input devices 66. Controller 70 may receive signals from the one or more input devices 66 and may be configured to operate the one or more servo motors, rack and pinion arrangements, string and pulley arrangements, or other mechanical devices to move the one or more proximity sensors 104, 106, 108, 110, 124, 126, receivers 112, 114, 118, 120, 130, 132, and/or targets 116, 122, 128 to the positions specified by the operator.

Additionally, although the above description refers to leg column 36 and track 28, each of leg columns 38, 40, 42 connected to tracks 30, 32, 34, respectively, may have structural and functional characteristics similar to those described above with respect to leg column 36 and track 28. Thus, for example, each of leg columns 38, 40, 42 may include any number of proximity sensors, receivers, and/or targets, including, for example, proximity sensors 104, 106, 108, 110, 124, 126, receivers 112, 114, 118, 120, 130, 132, and/or targets 116, 122, 128. It is also contemplated that distances $h_1$, $h_2$, $h_3$, $h_4$, $h_5$, $h_6$ may be equal or unequal and may be the same or different in leg columns 36, 38, 40, and/or 42.

Figure 4A:
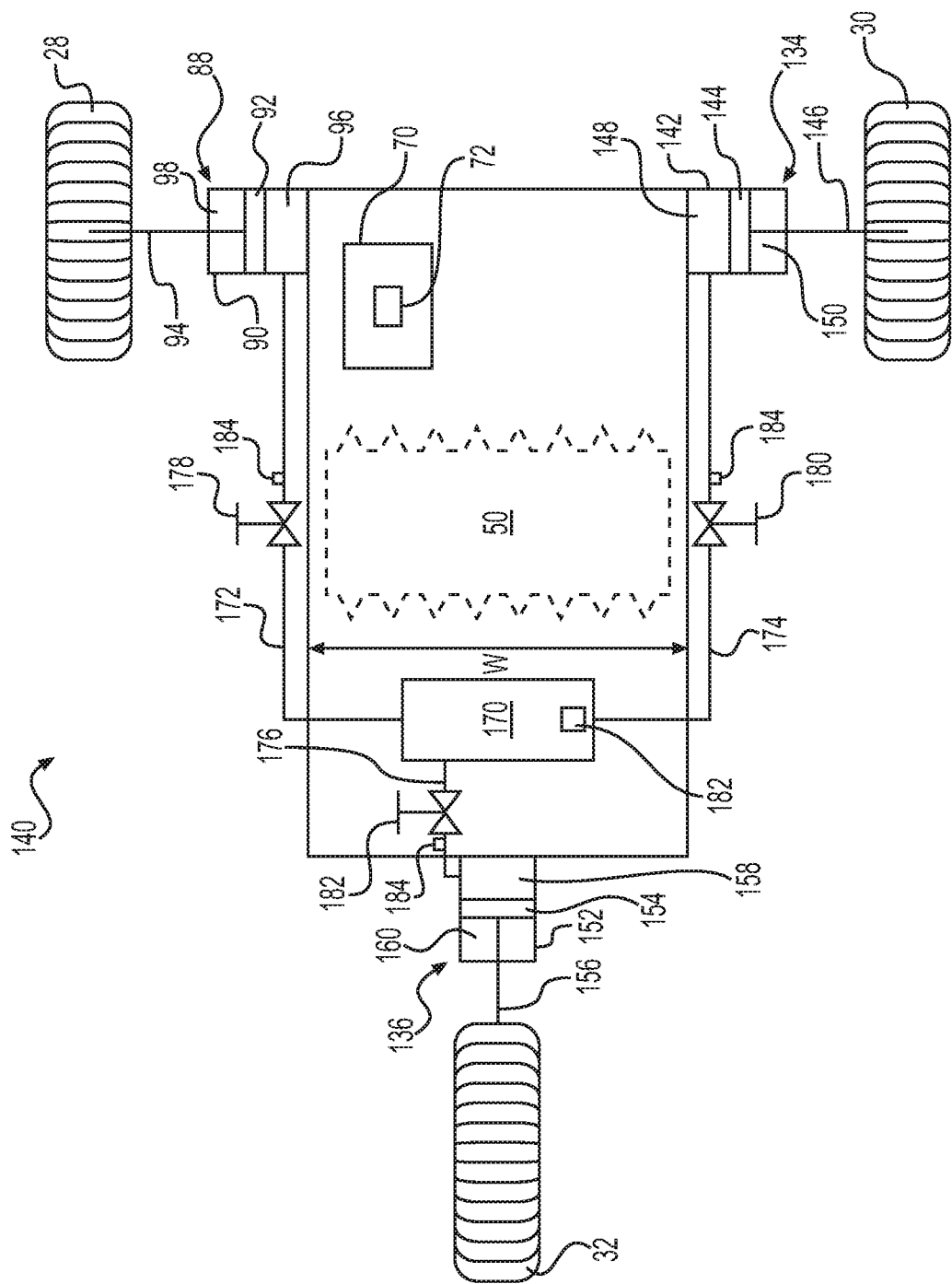
FIG. 4A is a schematic of an exemplary hydraulic circuit for the milling machines of FIGS. 1 and 2.

FIG. 4A illustrates a schematic of an exemplary hydraulic circuit 140 for milling machine 10 or 20. As illustrated in FIG. 4A, hydraulic circuit 140 may apply to milling machine 10 or 20 that may include two front tracks (e.g. left front track 28 and right front track 30) and one rear track 32. Left front track 28 may be connected to frame 22 via leg column 36 (see FIG. 1), right front track may be connected to frame 22 via leg column 38 (see FIG. 1), and rear track 32 may be connected to frame 22 via leg column 40 (see FIG. 1). As illustrated in FIG. 4A, rear track 32 may be positioned adjacent second end 26 of frame 22 and generally centered along a width "W" of frame 22.

Left front track 28 may be connected to frame 22 via left front actuator 88, right front track 30 may be connected to frame 22 via right front actuator 134, and rear track 32 may be connected to frame 22 via rear actuator 136. Actuators 88, 134, and 136 may be located within or outside leg columns 36, 38, and 40, respectively. Left front actuator 88 may be a single-acting or double-acting hydraulic actuator and may have structural and functional characteristics similar to those described above with respect to FIGS. 3A and 3B. Right front actuator 134 may be a single-acting or double-acting hydraulic actuator and may include cylinder 142, piston 144, and rod 146. Piston 144 may be slidably disposed in cylinder 142 and may divide cylinder 142 into head-end chamber 148 and rod-end chamber 150. That is, piston 144 may be configured to slide within cylinder 142. One or both of head-end chamber 148 and rod-end chamber 150 may be configured to hold and receive hydraulic fluid. Cylinder 142 may be connected to frame 22 adjacent head-end chamber 148. Rod 146 may be connected at one end to piston 144 and at an opposite end to track 30. Similarly, rear actuator 136 may be a single-acting or double-acting hydraulic actuator and may include cylinder 152, piston 154, and rod 156. Piston 154 may be slidably disposed in cylinder 152 and may divide cylinder 152 into head-end chamber 158 and rod-end chamber 160. That is, piston 154 may be configured to slide within cylinder 152. One or both of head-end chamber 158 and rod-end chamber 160 may be configured to hold and receive hydraulic fluid. Cylinder 152 may be connected to frame 22 adjacent head-end chamber 158. Rod 156 may be connected at one end to piston 154 and at an opposite end to track 32.

Milling machine 10 or 20 may also include tank 170, which may be configured to store hydraulic fluid. One or more of head-end chambers 96, 148, 158, and/or rod-end chambers 98, 150, 160 may be connected to tank 170 and may receive hydraulic fluid from or direct hydraulic fluid to tank 170. For example, as illustrated in FIG. 4A, tank fluid conduit 172 may connect tank 170 with head-end chamber 96 of actuator 88, tank fluid conduit 174 may connect tank 170 with head-end chamber 148 of actuator 134, and tank fluid conduit 176 may connect tank 170 to head-end chamber 158 of actuator 136. Thus, for example, hydraulic fluid may flow from tank 170 to one or more of head-end chambers 96, 148, 158 or vice versa. Milling machine 10 or 20 may include additional fluid conduits, control valves, pressure relief valves, pumps, filters and other hydraulic components connecting actuators 88, 134, and/or 136 to tank 170. For example, it is contemplated that rod-end chambers 98, 150, and 160 may also be connected to tank 170 via fluid conduits, which may include control valves to control the flow rate of hydraulic fluid between tank 170 and one or more of rod-end chambers 98, 150, and 160. Discussion of these additional hydraulic components in this disclosure is omitted for succinctness and clarity.

Control valve 178 may be disposed in tank fluid conduit 172 and may be configured to control a flow rate of hydraulic fluid between tank 170 and head-end chamber 96. Control valve 180 may be disposed in tank fluid conduit 174 and may be configured to control a flow rate of hydraulic fluid between tank 170 and head-end chamber 148. Control valve 182 may be disposed in tank fluid conduit 176 and may be configured to control a flow rate of hydraulic fluid between tank 170 and head-end chamber 158. Control valves 178, 180, 182 may be multi-position or proportional type valves having a valve element movable to regulate a flow of hydraulic fluid through tank fluid conduits 172, 174, 176, respectively. In the flow-passing position, control valves 178, 180, 182 may permit hydraulic fluid to flow through tank fluid conduits 172, 174, 176, respectively, substantially unrestricted by control valves 178, 180, 182, respectively. In contrast, in the flow-blocking position, control valves 178, 180, 182 may completely block hydraulic fluid from flowing through tank fluid conduits 172, 174, 176. The valve element of control valves 178, 180, 182 may also be selectively movable to various positions between the flow-passing and flow-blocking positions to provide for variable flow rates of hydraulic fluid in tank fluid conduits 172, 174, 176, respectively.

In one exemplary embodiment, valve elements in control valves 178, 180, 182 may be solenoid-operable to move between a flow-passing position and a flow-blocking position. That is movement of the valve elements of control valves 178, 180, 182 may be effected by solenoids, which may be energized by allowing electric current to flow through the solenoids. An amount of movement of the valve elements of control valves 178, 180, 182 may be based on an amount of current flowing through their respective solenoids. Thus, a position of the valve element and consequently a flow rate of hydraulic fluid through control valves 178, 180, 182 may depend on an amount of electric current flowing through control valves 178, 180, 182.

Figure 5:
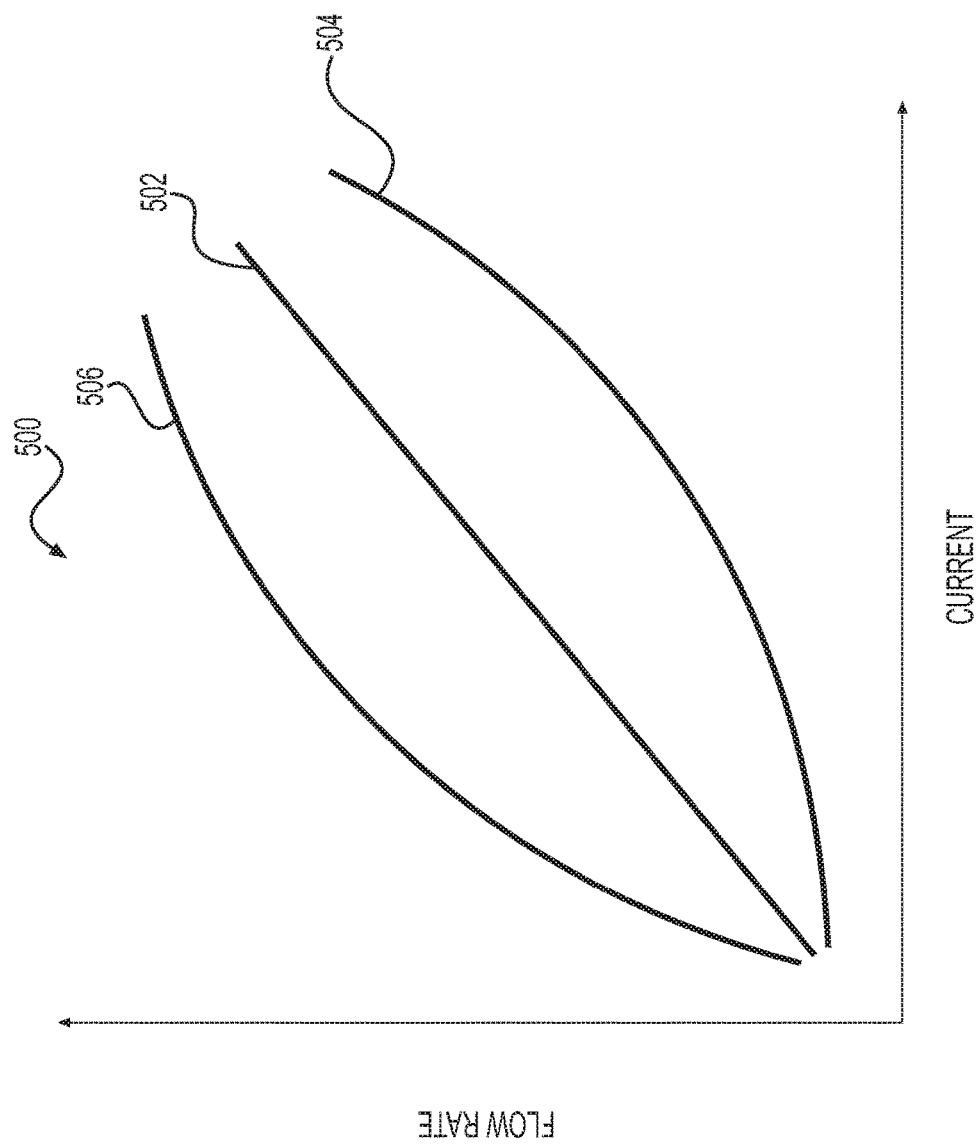
FIG. 5 is an exemplary chart showing various correlations between an amount of current flowing through a control valve and a flow rate of hydraulic fluid for exemplary disclosed control valves of the hydraulic circuits of FIGS. 4A and 4B.

FIG. 5 illustrates chart 500 showing exemplary variations of flow rate vs. current for the one or more control valves 178, 180, 182. For example, as shown by line 502, the flow rate of hydraulic fluid through control valves 178, 180, or 182 may vary linearly with an amount of current flowing through control valves 178, 180, or 182. In other embodiments, the flow rate of hydraulic fluid through control valves 178, 180, or 182 may vary non-linearly with an amount of current flowing through control valves 178, 180, or 182 as illustrated, for example, by lines 504 and 506. Although lines 502, 504, 506 in FIG. 5 illustrate that flow rate increases with increasing amount of current, it is contemplated that in some embodiments, a flow rate of hydraulic fluid through control valves 178, 180, or 182 may decrease with increasing amount of current or may have different (e.g. increasing vs. decreasing) behavior for different ranges of current. It is also contemplated that the variation of flow rate of the hydraulic fluid with the amount of current may not be continuous as illustrated by lines 502, 504, 506, but instead may take discrete values or may be piecewise continuous. Various other mathematical relationships between current and flow rate are also contemplated. The data represented by lines 502, 504, 506 or other data relating flow rate to current may be stored in memory device 72 associated with controller 70. In some embodiments, the relationship between flow rate and current may be in the form of lookup tables, which may be stored in memory device 72. Although FIG. 5 illustrates a two-dimensional relationship between current and flow rate of the hydraulic fluid, it is contemplated that the flow rate may additionally or alternatively depend on other parameters, such as, temperature, pump pressure, properties of the hydraulic oil (e.g. density, viscosity, etc.) and/or other operating parameters of milling machine 10 or 20. It is contemplated that relationships between an amount of current, flow rate of the hydraulic fluid, and or these other machine parameters may be stored in the form of charts, graphs, mathematical functions, algorithms, and/or lookup tables in memory device 72.

It is also contemplated that in some exemplary embodiments, the movement of valve elements of control valves 178, 180, or 182 may be directly related to flow rate. For example, linear or rotary encoders may be configured to determine an amount of movement of the valve elements relative to, for example, the flow-blocking positions of the valve elements. Controller 70 may be configured to receive signals (e.g. an amount of current or voltage) from the encoders. Correlations, graphs, mathematical functions, algorithms, lookup tables, etc., stored in memory device 72, may relate the signals from the encoders to the flow rate of the hydraulic fluid. Controller 70 may be configured to use the information stored in memory device 72 to determine the flow rate of the hydraulic fluid through the one or more control valves 178, 180, or 182 corresponding to the encoder signals. Although elements 178, 180, 182 have been described as control valves above, it is contemplated that one or more of elements 178, 180, 182 may instead take the form of individually controllable pumps or other fluid control devices. Regardless of whether elements 178, 180, 182 are control valves, pumps, or other fluid control devices, a current, a voltage, a mechanical movement, etc. associated with elements 178, 180, 182 may be correlated to the flow rate of hydraulic fluid through the respective elements 178, 180, 182.

Returning to FIG. 4A, controller 70 may receive a signal from input device 66 indicating how fast an operator desires to raise or lower frame 22. For example, input device 66 may have multiple positions corresponding to different speeds (or rates) at which frame 22 may be raised or lowered relative to ground surface 64. Controller 70 may be configured to determine an amount of current that must flow through one or more of control valves 178, 180, or 182 corresponding to the position of input device 66. Controller 70 may be configured to control one or more electrical components associated with milling machine 10 or 20 to ensure the determined amount of current flows through, for example, solenoids of the one or more control valves 178, 180, or 182. This in turn may control an amount of movement of a valve element in the one or more control valves 178, 180, or 182 allowing a corresponding flow rate of hydraulic fluid into or out of actuators 88, 134, or 136, respectively. It is also contemplated that in some exemplary embodiments, controller 70 may receive signals from a current or voltage sensor associated with the one or more control valves 178, 180, or 182. Controller 70 may be configured to determine an amount of current flowing through the one or more control valves 178, 180, or 182 based on the signals received by controller 70 from the current or voltage sensor. Controller 70 may be configured to determine the flow rate of the hydraulic fluid corresponding to the amount of current based on, for example, the information relating the amount of current and the flow rate of hydraulic fluid stored in memory device 72.

Hydraulic circuit 140 may include one or more temperature sensors 184, which may be configured to determine a temperature of the hydraulic fluid in tank 170 or of the hydraulic fluid flowing through control valves 178, 180, or 182. Temperature sensors 184 may be disposed in tank 170 or in the one or more tank fluid conduits 172, 174, 176. Controller 70 may be configured to correct the flow rate of the hydraulic fluid based on the temperature. For example, at higher temperatures, the hydraulic fluid may be less viscous and may have a lower density as compared to at lower temperatures. The viscosity and density of the hydraulic fluid may influence the flow rate of the hydraulic fluid through control valves 178, 180, or 182. Controller 70 may utilize correlations, graphs, tables, mathematical relations, algorithms, etc. that relate a temperature of the hydraulic fluid to its flow rate to correct the flow rate determined based on the current flowing through control valves 178, 180, or 182.

Controller 70 may also be configured to determine an amount (e.g. mass or volume) of hydraulic fluid flowing through the one or more control valves 178, 180, or 182 into or out of head-end chambers 96, 148, or 158, respectively, based on the flow rate and an amount of time associated with the flow rate. Controller 70 may employ an internal timer to determine an amount of time associated with the flow rate. For example, controller 70 may monitor one or more input devices 66 configured to raise or lower frame 22. Controller 70 may employ the timer to determine a time period for which an operator may activate the one or more input devices 66 to raise or lower frame 22 relative to ground surface 64. Controller 70 may also determine an amount of flow of hydraulic fluid into or out of actuators 88, 134, 136 based on the determined flow rate and the time associated with the determined flow rate. Further, based on the geometrical dimensions of the corresponding cylinders 90, 142, or 152, controller 70 may determine an extension of rod 94, 146, or 156 (i.e. amount of displacement or linear movement) of pistons 92, 144, and 154, respectively, and may further determine a height of frame 22 relative to ground surface 64 based on the determined extension of rod 94, 146, or 156. Thus, by determining an amount of current flowing through each of control valves 178, 180, and 182, controller 70 may be configured to determine heights of frame 22 relative to ground surface 64 adjacent tracks 28, 30, and 32, respectively. In some exemplary embodiments, controller 70 may also be configured to cause display 68 to display the determined heights of frame 22.

Controller 70 may also be configured to correct the heights determined based on the amounts of current flowing through control valves 178, 180, and 182. For example, consider the situation in which an operator uses one or more input devices 66 to raise a height of frame 22 relative to ground surface 64. Controller 70 may receive a signal from proximity sensor 104 indicating that edge 86 of second section 82 is disposed adjacent proximity sensor 104. Controller 70 may also determine that in this position, frame 22 is disposed at a height "$H_{measured}$" relative to ground surface 64 adjacent track 28 based on an amount of current flowing through control valve 178. As discussed above, when edge 86 of second section 82 is disposed adjacent proximity sensor 104, controller 70 may determine that actual height "$H_{actual}$" of frame 22 relative to ground surface 64 is "$h_1+h_2$." Controller 70 may compare the measured and actual heights and determine a height error "$\Delta H = H_{actual} - H_{measured}$." Controller 70 may correct measured height H using the measured height error $\Delta H$. In some exemplary embodiments, controller 70 may be configured to determine the error $\Delta H$ whenever it receives signals from the one or more proximity sensors 104, 106, 108, 110, 124, or 126. Alternatively, controller 70 may be configured to determine the error at predetermined time intervals or based on an input received from an operator via the one or more input devices 66.

It is further contemplated that controller 70 may be configured to determine an error in the flow rate of the hydraulic fluid based on the determined height error $\Delta H$. Controller 70 may modify one or more of the charts, graphs, mathematical functions, algorithms, or lookup tables relating the amount of current to the flow rate of the hydraulic fluid based on the determined flow error. Controller 70 may update the one or more of the charts, graphs, mathematical functions, algorithms, or lookup tables relating the amount of current and the flow rate of the hydraulic fluid, using the flow rate error. Controller 70 may store the updated one or more of the charts, graphs, mathematical functions, algorithms, or lookup tables in memory device 72. In some exemplary embodiments, controller 70 may execute machine learning algorithms to determine variations of the height error or flow rate error and may update the relationship between the amount of current and the flow rate in memory device 72 based on the machine learning algorithms.

Figure 4B:
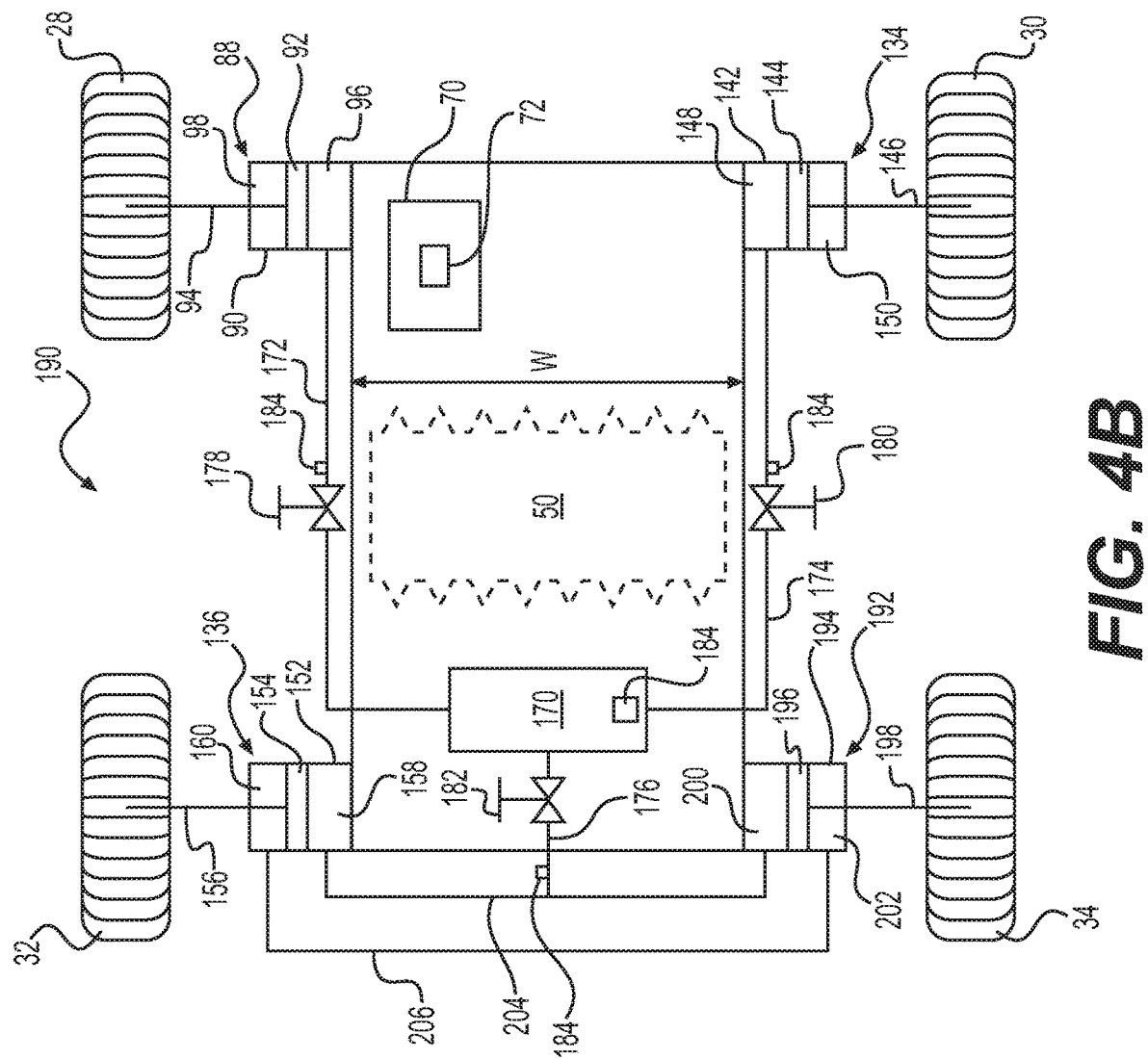
FIG. 4B is a schematic of another exemplary hydraulic circuit for the milling machines of FIGS. 1 and 2.

FIG. 4B illustrates a schematic of another exemplary hydraulic circuit 190 for milling machine 10 or 20. As illustrated in FIG. 4B, hydraulic circuit 190 may apply to milling machine 10 or 20 that includes two front tracks (e.g. left front track 28 and right front track 30) and two rear tracks (e.g. left rear track 32 and right rear track 34). Many of the features of hydraulic circuit 190 illustrated in FIG. 4B are similar to those of hydraulic circuit 140 of FIG. 4A. In the following disclosure, only features of hydraulic circuit 190 that are different from those of hydraulic circuit 140 will be discussed in detail. As described above with respect to FIG. 4A, left front track 28 may be connected to frame 22 via leg column 36 (see FIG. 1), right front track may be connected to frame 22 via leg column 38 (see FIG. 1), and left rear track 32 may be connected to frame 22 via leg column 40 (see FIG. 1). Furthermore, right rear track 34 may be connected to frame 22 via leg column 42 (see FIG. 1). As illustrated in FIG. 4B, however, left rear track 32 may be positioned adjacent one side of frame 22 and right rear track 34 may be positioned adjacent an opposite side of frame 22 and laterally spaced apart from left rear track 32 along a width W of frame 22.

Left front track 28 may be connected to frame 22 via left front actuator 88, right front track 30 may be connected to frame 22 via right front actuator 134, left rear track 32 may be connected to frame 22 via left rear actuator 136, and right rear track 34 may be connected to frame 22 via right rear actuator 192. Actuators 88, 134, 136, and 192 may be located within or outside leg columns 36, 38, 40, 42, respectively. Left front actuator 88, right front actuator 134, and left rear actuator 136 may have structural and functional characteristics similar to those described above. Right rear actuator 192 may include cylinder 194, piston 196, and rod 198. Piston 196 may be slidably disposed within cylinder 194 and may divide cylinder 194 into head-end chamber 200 and rod-end chamber 202. That is piston 196 may be configured to slide within cylinder 194. One or both of head-end chamber 200 and rod-end chamber 202 may be configured to hold and receive hydraulic fluid. Cylinder 194 may be connected to frame 22 adjacent head-end chamber 200. Rod 198 may be connected at one end to piston 196 and at an opposite end to track 34.

As also illustrated in FIG. 4B, left rear actuator 136 and right rear actuator 192 may be connected to each other to form a full-floating axle. For example, head-end chamber 158 of left rear actuator 136 may be connected to head-end chamber 200 of right rear actuator 192 via head-end fluid conduit 204. Similarly, rod-end chamber 160 of left rear actuator 136 may be connected to rod-end chamber 202 of right rear actuator 192 via rod-end fluid conduit 206. Tank fluid conduit 176 may connect tank 170 to head-end fluid conduit 204. Thus, hydraulic fluid may flow from tank 170 to both head-end chambers 158 and 200 of left rear actuator 136 and right rear actuator 192. Control valve 182 may be disposed in tank fluid conduit 176. Although FIG. 4B illustrates left rear actuator 136 and right rear actuator 192 as being connected via head-end fluid conduit 204 and rod-end fluid conduit 206, it is contemplated that in some exemplary embodiments, left rear actuator 136 and right rear actuator 192 may not be connected to each other. In this configuration, head-end chambers 158 and 200 of left rear actuator 136 and right rear actuator 192, respectively, may be separately connected to tank 170 via separate fluid conduits. Each of these fluid conduits may include its own control valve which may have structural and functional characteristics similar to those of control valves 178, 180, 182.

A method of determining a height of a frame 22 of milling machine 10 or 20 will be described in more detail below.

INDUSTRIAL APPLICABILITY

Controller 70 and hydraulic circuits 140, 190 of the present disclosure may be used on milling machine 10 or 20 to determine a height of frame 22 of milling machine 10 or 20 relative to ground surface 64. In particular, a height of frame 22 may be determined based on an amount of current flowing in one or more control valves 178, 180, 182 of milling machine 10 or 20. The determined height may also be corrected using signals from one or more proximity sensors 104, 106, 108, 110, 124, 126.

Figure 6:
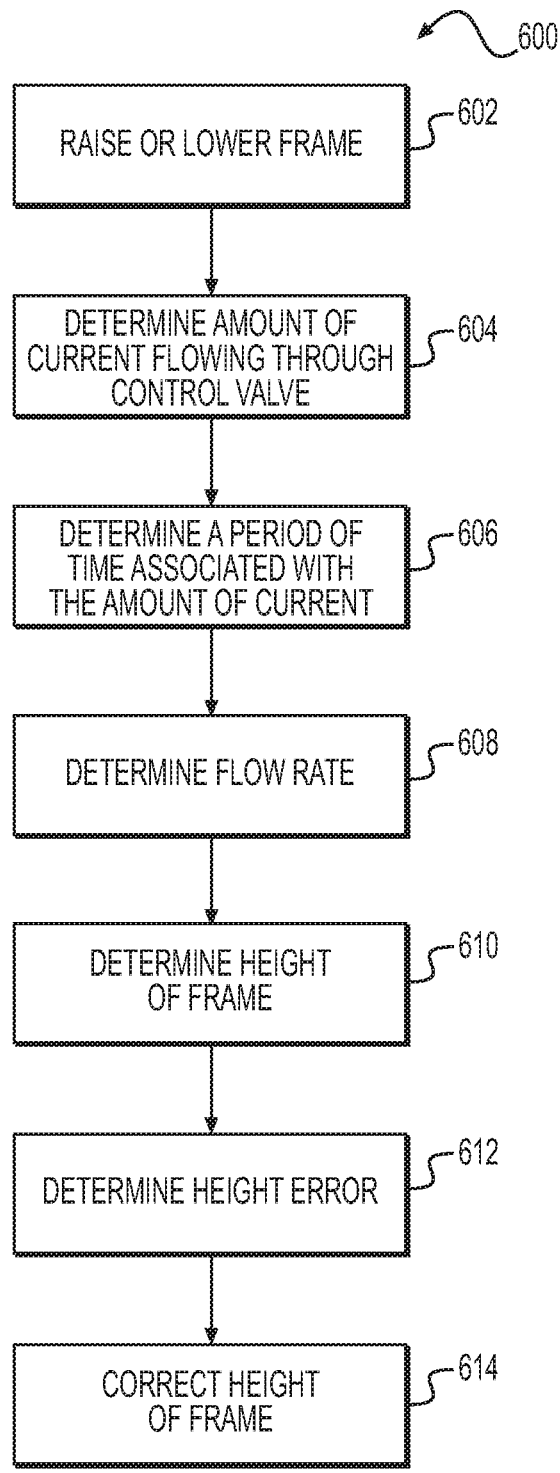
FIG. 6 is an exemplary method of determining a height of a frame of a milling machine relative to a ground surface.

FIG. 6 illustrates an exemplary method 600 of determining a height of a frame 22 of milling machine 10 or 20 relative to ground surface 64 using hydraulic circuit 140 or 190. The order and arrangement of steps of method 600 is provided for purposes of illustration. As will be appreciated from this disclosure, modifications may be made to method 600 by, for example, adding, combining, removing, and/or rearranging the steps of method 600. Method 600 may be executed by controller 70. Although method 600 is described below with reference to front actuator 88, method 600 and its steps as described below and as illustrated in FIG. 6 are equally applicable to front actuator 134, and rear actuators 136, 192.

Method 600 may include a step of raising or lowering frame 22 relative to ground surface 64 (Step 602). An operator may perform such an operation, for example, to raise the frame to a service height for performing maintenance operations or to position frame 22 at a particular height and inclination relative to the ground surface before beginning milling operations. Controller 70 may receive signals from one or more input devices 66 indicating that an operator desires to raise or lower frame 22 of milling machine 10 or 20. Controller 70 may cause one or more pumps associated with milling machine 10 or 20 to pump hydraulic fluid from tank 170 into or out of one or more of head-end chambers 96, 148, 158, and/or 200 via one or more of tank fluid conduits 172, 174, 176 to increase or decrease heights of frame 22 adjacent one or more of tracks 28, 30, 32, and/or 34. By way of example, controller 70 may control one or more electrical components of milling machine 10 or 20 to allow current to flow through the one or more control valves 178, 180, 182, thereby moving their respective valve elements from a flow-blocking position. This in turn may allow hydraulic fluid to flow via tank fluid conduits 172, 174, 176. As frame 22 is raised or lowered, controller 70 may receive signals indicating, for example, whether edge 84 or target 128 of first section 80 is positioned adjacent one of proximity sensors 108 or 110; whether edge 86 or target 116 is positioned adjacent one of proximity sensors 104 or 106; or whether edge 86, track end 102 or target 128 is positioned adjacent one of proximity sensors 124 or 126. As discussed above, based on these signals and the known geometrical dimensions of milling machine 10 and 20, controller may determine an initial height "$H_{initial}$" of frame 22 relative to ground surface 64.

Method 600 may include a step of determining an amount of current flowing through control valve 178 (Step 604). Controller 70 may determine the amount of current in one of two ways. In some embodiments, controller 70 may control one or more electrical components of machine 10 or 20 to ensure that a predetermined amount of current flows through control valve 178. For example, operator platform 62 may include an input device 66 (e.g. button, switch, lever, touch screen, etc.) which may have a plurality of positions associated with different rates at which frame 22 can be raised or lowered. Controller 70 may determine an amount of current corresponding to a position of input device 66. Controller may control one or more electrical components associated with milling machine 10 or 20 to cause the determined amount of current to flow through control valve 178, thereby moving its valve element from a flow-blocking position and allowing hydraulic fluid to flow into or out of head-end chamber 96 of actuator 88. In other exemplary embodiments, controller 70 may receive signals from a current sensor associated with control valve 178 and may be configured to determine the amount of current flowing through control valve 178 based on the received signals.

Method 600 may include a step of determining a period of time associated with the amount of current flowing through control valve 178 (Step 606). Controller 70 may determine a period of time for which the determined current flows through control valve 178. Controller 70 may do so using a timer associated with controller 70. In some exemplary embodiments, controller 70 may continuously monitor the current flowing through control valve 178 over a period of time. Controller 70 may store the variation of current with time in memory device 72.

Method 600 may include a step of determining a flow rate of hydraulic fluid through control valve 178 (Step 608). Controller 70 may use data relating the current flowing through control valve 178 to the flow rate of hydraulic fluid through control valve 178 to determine the flow rate through control valve 178. For example, controller 70 may employ data representing graphs, charts, mathematical functions, algorithms, lookup tables, etc. stored in memory device 72 to determine the flow rate corresponding to the determined current. In some embodiments, controller 70 may also determine a variation of flow rate with time based on the relationship between current and flow rate and based on the variation of current over time stored in memory device 72.

Method 600 may include a step of determining a height of frame 22 relative to ground surface 64 (Step 610). Controller 70 may determine an amount of flow of hydraulic fluid into or out of head-end chamber 96 based on the flow rate and period of time determined, for example, in steps 604 and 606. In some exemplary embodiments, controller 70 may employ integration, summation, or other mathematical operations to determine the amount of flow of hydraulic fluid based on the variation of flow rate with time determined in, for example, step 608.

Controller 70 may determine an extension (or retraction) of rod 94 (or actuator 88) based on the determined amount of flow. For example, based on known geometric dimensions of cylinder 90 and piston 92, controller 70 may determine a cross-sectional area "A" of cylinder 90 or piston 92. Controller 70 may then determine the extension (or retraction) "ΔL" of rod 94 (or actuator 88) by dividing the determined amount of flow of hydraulic fluid by cross-sectional area A. It is contemplated that controller 70 may perform other mathematical operations or employ other algorithms to determine the extension (or retraction) ΔL of rod 94. In one exemplary embodiment, controller 70 may determine a measured height $H_{measured}$ of frame 22 relative to ground surface 64 based on the initial height $H_{initial}$ and the extension (or retraction) ΔL of rod 94. Controller 70 may also be configured to cause display 68 to display the determined height $H_{measured}$ of frame 22.

Method 600 may include a step of determining a height error (Step 612). Controller 70 may be configured to determine the height error when controller 70 receives signals from one or more of proximity sensors 104, 106, 108, 110, 124, or 126. As discussed above, when controller 70 receives signals from one or more of proximity sensors 104, 106, 108, 110, 124, or 126, controller 70 may be configured to determine an actual height $H_{actual}$ based on the known geometrical dimensions of machine 10 or 20 and the known positions of the proximity sensors 104, 106, 108, 110, 124, or 126 relative to frame 22 or ground surface 64. By way of example, controller 70 may receive a signal from proximity sensor 106 when edge 86 or target 116 may be positioned adjacent proximity sensor 106. Based on, for example, a position of proximity sensor 106 at a distance $h_1+h_2$ relative to frame 22, and a position of edge 86 at a distance $H_2$ relative to ground surface 64 (see FIG. 3A), controller 70 may determine the actual height $H_{actual}$ as being about equal to a sum of the two distances, namely $h_1+h_2+Hz$. Controller 70 may then determine the height error ΔH as the difference between actual height $H_{actual}$ and the measured height $H_{measured}$.

In some exemplary embodiments, controller 70 may use a timer to monitor times at which pairs of proximity sensors are triggered to determine a height error. For example, as actuator 88 is being extended, controller 70 may receive a signal from proximity sensor 104 at time "$t_1$," indicating that edge 86 of second section 82 is positioned adjacent proximity sensor 104. Controller 70 may also receive a signal from proximity sensor 106 at time "$t_2$," indicating that edge 86 of second section 82 is positioned adjacent proximity sensor 106. Controller 70 may determine the extension ΔL of rod 94 in the time period between times $t_1$ and $t_2$ by determining a current flowing through control valve 178 during the time period from $t_1$ to $t_2$. Controller 70 may use the data stored in memory device 72 relating the amount of current to the flow rate to determine the flow rate associated with the determined amount of current. Controller 70 may also determine an amount of hydraulic fluid flowing into of head-end chamber 96 between time periods $t_1$ and $t_2$ based on the determined flow rate and the time period between times $t_1$ and $t_2$. Controller may compare the extension ΔL of rod 94 with the known distance $h_2$ between proximity sensors 104 and 106 to determine the height error ΔH. For example, controller 70 may determine the height error as $h_2-ΔL$.

Method 600 may include a step of correcting a height of frame 22 (Step 614). Controller 70 may correct measured height $H_{measured}$ of frame 22 determined, for example, in step 610 using the height error ΔH determined, for example, in step 612. For example, controller 70 may correct the height by adding the height error ΔH to the measured height $H_{measured}$. Controller 70 may also store the value of the height error ΔH in memory device 72 and may correct subsequently measured heights using the stored value of the height error ΔH. Controller 70 may also be configured to cause display 68 to display the corrected height. Controller 70 may repeat the determination of height error ΔH when it receives signals from the one or more proximity sensors 104, 106, 108, 110, 124, or 126. Alternatively, controller 70 may determine height error ΔH periodically or based on an input received from the operator.

It will be apparent to those skilled in the art that various modifications and variations can be made to the disclosed milling machine. Other embodiments will be apparent to those skilled in the art from consideration of the specification and practice of the disclosed milling machine. It is intended that the specification and examples be considered as exemplary only, with a true scope being indicated by the following claims and their equivalents.

What is claimed is:

1. A milling machine, comprising:
   a frame;
   a milling drum attached to the frame;
   a plurality of ground engaging tracks configured to support the frame and to propel the milling machine in a forward or rearward direction;

a plurality of actuators connecting the frame to the tracks, the actuators being configured to adjust a height of the frame relative to a ground surface, each of the actuators including:
  a cylinder attached to the frame and containing a hydraulic fluid;
  a piston slidably disposed within the cylinder; and
  a rod having a first end connected to the piston and extending to a second end connected to a track from among the plurality of ground engaging tracks;
a tank configured to store the hydraulic fluid;
a fluid conduit connecting the tank to the cylinder;
a control valve configured to selectively control a flow rate of the hydraulic fluid in the fluid conduit; and
a controller configured to determine the height of the frame relative to the ground surface by:
  determining an amount of current flowing through the control valve; and
  determining the flow rate based on the amount of current.

2. The milling machine of claim 1, wherein the controller is configured to determine the height of the frame by:
  determining a period of time associated with the flow rate;
  determining an amount of flow of hydraulic fluid through the control valve based on the flow rate and the period of time; and
  determining an extension of the rod caused by the determined amount of flow.

3. The milling machine of claim 2, further including a proximity sensor positioned at a predetermined distance from the frame or the track.

4. The milling machine of claim 3, wherein the controller is further configured to:
  receive a signal from the proximity sensor;
  determine an error in the extension of the rod based on the received signal; and
  correct the height based on the error.

5. The milling machine of claim 1, further including a memory configured to store data relating the amount of current and the flow rate, wherein the controller is configured to determine the flow rate based on the data.

6. The milling machine of claim 1, further including a temperature sensor configured to determine a temperature of the hydraulic fluid, wherein the controller is configured to adjust the flow rate based on the temperature.

7. The milling machine of claim 1, further including a plurality of leg columns connecting the frame to the tracks, each of the leg columns, including:
  a first section connected to the frame;
  a second section connected to one track from among the tracks, the first and second sections being slidably movable relative to each other; and
  an actuator from the plurality of actuators.

8. The milling machine of claim 7, further including a proximity sensor positioned on the first section at a predetermined distance from the frame, wherein
  the proximity sensor is configured to generate a signal upon detecting an edge of the second section, and
  the controller is further configured to:
    receive the signal from the proximity sensor;
    determine an error in an extension of the rod based on the received signal; and
    correct the height based on the error.

9. The milling machine of claim 8, wherein
  the proximity sensor is a first proximity sensor and the signal is a first signal,
  the predetermined distance is a first predetermined distance,
  the milling machine further includes a second proximity sensor attached to the first section, the second proximity sensor being spaced apart from the first proximity sensor by a second distance, and
  the second proximity sensor is configured to generate a second signal upon detecting the edge of the second section.

10. The milling machine of claim 9, wherein the controller is further configured to:
  receive the first signal from the first proximity sensor at a first time,
  receive the second signal from the second proximity sensor at a second time,
  determine an extension of the rod in a time period between the first and second times; and
  determine the error based on the determined extension of the rod and the second distance.

11. The milling machine of claim 1, wherein the control valve is a solenoid control valve.

12. A method of determining a height of a frame of a milling machine relative to a ground surface, the frame being supported by a plurality of tracks connected to the frame by a plurality of actuators, a tank configured to store hydraulic fluid, each actuator being connected to the tank via a fluid conduit, a control valve disposed in the fluid conduit, and a controller, the method comprising:
  operating the milling machine by raising or lowering the frame relative to at least one track from among the plurality of tracks;
  determining an amount of current flowing through the control valve associated with at least one actuator from among the plurality of actuators;
  determining, using the controller, a flow rate of the hydraulic fluid through the control valve; and
  determining, using the controller, the height of the frame relative to the tracks based on the flow rate.

13. The method of claim 12, wherein determining the height of the frame further includes:
  determining a period of time associated with the flow rate;
  determining an amount of flow of hydraulic fluid into the at least one actuator based on the flow rate and the period of time; and
  determining an extension of the actuator based on the amount of flow.

14. The method of claim 12, wherein determining the flow rate further includes:
  determining, using a temperature sensor, a temperature of the hydraulic fluid in the fluid conduit; and
  adjusting, using the controller, the flow rate based on the temperature.

15. The method of claim 12, wherein the milling machine includes a leg column connecting the frame to a track from the plurality of tracks, the leg column including a first section connected to the frame, a second section slidably movable relative to the first section and connected to the track, and an actuator from the plurality of actuators, the method further comprising:
  receiving, from a first proximity sensor positioned on the first section, a first signal at a first time;
  receiving, from a second proximity sensor positioned on the first section at a predetermined distance from the first proximity sensor, a second signal at a second time;
  determining, using the controller, an extension of the actuator in a time period between the first and second times; and determining an error in the height based on the extension of the actuator and the predetermined distance.

16. A milling machine, comprising:
a frame;
a left front track disposed adjacent a front end of the frame;
a right front track disposed adjacent the front end and spaced apart from the left front track;
at least one rear track disposed adjacent a rear end of the frame;
a milling drum connected to the frame and disposed between the front end and the rear end;
an engine configured to rotate the milling drum and propel the left front track, the right front track, and the at least one rear track in a forward or rearward direction;
height adjustable leg columns connecting the frame to the left front track, the right front track, and the at least one rear track, each of the leg columns including:
an upper section connected to the frame;
a lower section slidably movable relative to the upper section and connected to one track of the left front track, the right front track, and the at least one rear track; and
a height adjustable actuator connected at one end to the frame and at an opposite end to the one track;
a tank configured to store hydraulic fluid;
a fluid conduit connecting the tank to the actuator;
a control valve configured to selectively control a flow rate of the hydraulic fluid in the fluid conduit between the tank and the actuator; and
a controller configured to:
determine an amount of current flowing through the control valve;
determine the flow rate of the hydraulic fluid in the fluid conduit based on the amount of current; and
determine a height of the frame relative to a ground surface based on the determined flow rate.

17. The milling machine of claim 16, further including:
a first proximity sensor positioned on the upper section at a first height from the frame; and
a second proximity sensor positioned on the upper section at a second height from the first proximity sensor, wherein each of the first and second proximity sensors are configured to generate a signal when an edge of the lower section is disposed adjacent a respective one of the first and the second proximity sensors.

18. The milling machine of claim 17, wherein the controller is further configured to:
receive signals from the first and second proximity sensors;
determine an elapsed time between receipt of the signals;
determine an amount of flow of the hydraulic fluid in the fluid conduit based on the flow rate and the elapsed time; and
determine a change in the height of the actuator based on the amount of flow.

19. The milling machine of claim 18, further including an operator platform including a display, wherein the controller is further configured to:
determine an error in the height based on the change, the first height, and the second height;
correct the height based on the error; and
display the corrected height on the display.

* * * * *